US005649045A

United States Patent [19]
Fjare et al.

[11] Patent Number: 5,649,045
[45] Date of Patent: Jul. 15, 1997

[54] POLYIMIDE OPTICAL WAVEGUIDE STRUCTURES

[75] Inventors: Douglas E. Fjare; David A. Wargowski, both of Naperville, Ill.

[73] Assignee: Amoco Corporation, Chicago, Ill.

[21] Appl. No.: 571,448

[22] Filed: Dec. 13, 1995

[51] Int. Cl.$^6$ .................................................. G02B 6/00
[52] U.S. Cl. ........................................ 385/145; 528/353
[58] Field of Search ..................... 528/353; 385/141–145

[56] References Cited

U.S. PATENT DOCUMENTS

| | | | |
|---|---|---|---|
| 4,595,548 | 6/1986 | St. Clair et al. | 264/236 |
| 4,603,061 | 7/1986 | St. Clair et al. | 427/162 |
| 4,876,329 | 10/1989 | Chiang et al. | 528/353 |
| 4,952,669 | 8/1990 | Vora | 528/353 |
| 4,954,609 | 9/1990 | Vora | 528/353 |
| 4,978,738 | 12/1990 | Mueller et al. | 528/220 |
| 5,025,089 | 6/1991 | Vora et al. | 528/353 |
| 5,049,649 | 9/1991 | Rohitkumar | 528/353 |
| 5,089,593 | 2/1992 | Fjare et al. | 528/188 |
| 5,108,201 | 4/1992 | Matsuura et al. | 385/143 |
| 5,137,751 | 8/1992 | Burgess et al. | 427/123 |
| 5,292,445 | 3/1994 | Fjare et al. | 252/79.5 |
| 5,304,626 | 4/1994 | Burgess et al. | 528/353 |
| 5,317,082 | 5/1994 | Beuhler et al. | 528/353 |
| 5,326,600 | 7/1994 | Asaoka et al. | 428/1 |
| 5,344,916 | 9/1994 | Harris et al. | 528/353 |
| 5,354,839 | 10/1994 | Yamashita et al. | 528/188 |
| 5,470,943 | 11/1995 | Sakata et al. | 528/353 |

OTHER PUBLICATIONS

Kowalczyk, et al., "Guest–Host Cross–linked Polyimide for Integrated Optics", *Amer. Chem. Soc. Symp. Series 601*, Ch. 28, pp. 381–400 (1995).

Cahill, et al., "Pollyimide–based Electrooptic Materials", SPIE, vol 2025, pp. 48–55 (Jul. 1993).

Beuhler, et al., "Optical Waveguides from Photosensitive Polyimides", Extended Abstracts, 5th Intl. Conf. Polyimides, p. 10 (Nov. 1994).

Beuhler, et al., "Optical Polyimides for Single Mode Waveguides", SPIE, Vo. 1849, pp. 92–103 Optoelectronic Interconnects (Jan. 1993).

Kowalczyk, et al., "Loss Mechanisms in Polyimide Waveguides", J. Appl. Phys. 76(4), pp. 2505–2508 (Aug. 1994).

Beuhler, et al., "Fabrication of Low Loss Polyimide Optical Waveguides Using Thin–Film Multichip Module Process Technology", IEEE, Part B, vol. 18, No. 2, pp. 232–234 (May 1995).

Beuhler, et al., "Polyimide Optical Waveguides", Organic This Films for Photonic Applications 1993. Technical Digest Series, vol. 17, pp 254–257.

Meinhardt, et al., "Characterization of Crosslinked Electrooptical Polyimides", SPIE, Vo. 2143, pp. 110–116 (1994).

Meihnardt, et al., "Characterization of Thermally Stable Dye–Doped Polyimide Based Electrooptic Materials", Mat. Res. Co. Symp. Proc. vol. 328, pp. 467–475 (1994).

Kowalczyk, et al., "Crosslinked Polyimide Electro–optic Material", J. Appl. Phys. 78(10) pp. 5876–5883 (1995).

Stoakley, et al., "Low Dielectric, Fluorinated Polyimide Copolymers", J. Appl. Polymer Science, vol. 51, pp. 1479–1483 (1994).

Feger, et al., "Polimide Waveguiding at 830 nm", Ann. Tech. Conf. Soc. Plast. Eng., 49th, pp. 1594–1597 (1991).

*Primary Examiner*—John Ngo
*Attorney, Agent, or Firm*—Mary Jo Kanady; Wallace L. Oliver

[57] ABSTRACT

Polyimide optical waveguide structures comprising a core within a cladding wherein at least one of the core and the cladding is a polyimide containing 6FDA; and the complementary portion of the waveguide structure is a polyimide having partial replacement of the 6FDA of the core or cladding composition by BPDA, and wherein the difference in the birefringence of the core and cladding are less than the difference in the refractive index. Copolyimides containing 6FDA and BPDA moieties, and at least one diamine, which have properties useful in optical applications including adjustable refractive index and controllable birefringence, low optical losses, low optical absorbance, increased solvent resistance, and high thermal stability. A method for adjusting the refractive index to make useful copolyimide core/cladding waveguide structures by controlling the 6FDA/BPDA ratio.

26 Claims, No Drawings

POLYIMIDE OPTICAL WAVEGUIDE STRUCTURES

FIELD OF THE INVENTION

This invention relates to polyimides useful in optical waveguide structures. Specifically, this invention relates to polyimide optical waveguides and a method for selecting and preparing polyimides and polyimide copolymer compositions useful as core/cladding pairs wherein the core/cladding pair have adjustable refractive index and controlled birefringence, in addition to the properties of low optical loss, low optical absorbance, and high thermal stability.

BACKGROUND OF THE INVENTION

The data rates that can be attained using electrical signals become more difficult to achieve as the signal path becomes longer and the data transmission rate becomes higher. One solution is to convert the transfer of signals from the transfer of electrons to the transfer of photons which are capable of carrying high speed, high data rate computing signals (hundreds of megahertz to gigahertz frequencies) over long distances with respect to those attainable using electronics. These interconnects may be chip-to-chip, module to module, board to board, part of a backplane, or box to box. Additionally, it can be desirable to use photons rather than electrons to maintain the integrity of the signal.

Optical data transfer can be accomplished by an optical waveguide having a light-carrying core material embedded in a cladding material. The optical signal is transmitted through the core material via total internal reflection. Optical waveguides are used at the printed circuit board level for clock distribution and interconnection of single chip packages. Optical waveguides can be used at the backplane, board, and MCM level to accomplish clock and signal distribution. On silicon or other substrates, optical waveguides can be used to accomplish chip-to-chip connections.

Another use of waveguide components is to provide special functions in larger systems. Devices such as couplers, splitters, and combiners are in general use throughout the fiber optics industry.

Useful optical waveguides must have low optical transmission loss, low optical absorbance, and controllable refractive index and birefringence.

Useful optical waveguide structures consist of a light-carrying core material and a cladding. One requirement for the waveguide structure is that the refractive index of the cladding material be less than the refractive index of the core material. For passive guides, the cladding could be air, but polymer claddings are typically preferred so that the core material is isolated from any conducting (metallization) layers. With polymeric core and cladding layers one also may have the capability of adjusting the refractive index to provide a specific refractive index ratio between the core and cladding materials.

A planar waveguide has two modes (TE and TM) for both core and cladding, and the refractive index of the core is greater than the refractive index of the cladding in both modes. All waveguides coated on a planar surface will have a TE and a TM mode. The TM mode (also referred to as $n_\perp$) is perpendicular to the planar surface and the TE mode (also referred to as $n_\parallel$) is parallel with the planar surface. The lightwave carried by the waveguide can be described by two components polarized in the TE and TM modes, or polarized perpendicular and parallel to the substrate surface. The lightwave is confined in a mode when the refractive index of the core is greater than the cladding (in that mode). "Confined" means light will not escape from the waveguide and "unconfined" means that the light will be dispersed.

Birefringence is a measure of the difference in index for the two polarizations, TE and TM, that exist in planar waveguides. Birefringence can arise from a number of causes, many of which may be related to the chemical structure of the polymer used in the waveguide. Two common causes of birefringence are the orientation of the polymer, and strain induced by the process of forming the waveguide. Generally, a large birefringence is detrimental to the performance of the waveguide as it causes the two polarizations to have different properties. The properties most affected by birefringence are the mode size and the propagation velocity. A difference in mode size reduces the efficiency of coupling the waveguide to fiber (which has a circular mode). A difference in propagation velocity leads to dispersion and places an upper bound on the rate at which data may be effectively transmitted through the device. Birefringence is measured as a continuous scale with 0.0 being the ideal. Values from about minus 0.05 to about plus 0.05 will provide an acceptable polyimide for use in a waveguide with a birefringence from minus 0.025 to plus 0.025 being preferred.

While it is desired to minimize birefringence of both core and cladding materials in planar waveguides, it is equally desirable to minimize the difference in birefringence between the core and cladding. The following discussion illustrates how differences in the birefringence between the core and cladding materials affect waveguide performance. When the core refractive index is greater than the cladding refractive index in either TE or TM mode, that mode will always be confined, and waveguiding will exist in that mode. It is desirable to have both TE and TM modes equally confined, or equally birefringent. However, several core/cladding refractive index relationships exist in birefringent media. Consider the case when TE is confined, that is, when the refractive index of the core is greater than the refractive index of the cladding in the TE mode. If the refractive index differences in TM and TE are equal, the waveguide mode, to first order, will be the same for both the TE and TM modes. This illustrates the most preferred case, when the difference in birefringence of the core and cladding materials is zero. If the refractive index difference in TM is greater than in TE and the TM refractive index for the core is greater than for the cladding, the TM mode will be more tightly confined than the TE mode resulting in a smaller mode diameter for the TM mode. If the refractive index difference in TM is less than in TE and the TM index for the core is greater than for the cladding, the TM mode will be less confined than the TE mode resulting in a larger mode diameter for the TM mode. If the TM core refractive index is less than the TM cladding refractive index, there is no confined TM mode and significant amounts of optical power can be radiated away from the waveguide. Therefore, the ability to control both the refractive index and the birefringence of the core and the cladding are particularly important in planar optical waveguides. The same relationships will be true if TE and TM are transposed in the above discussions; i.e., if the TM mode is confined and the TE indices are considered.

For optical fiber-planar waveguide coupling applications it is important that the refractive index and the birefringence of the core and cladding materials of the planar waveguide are controllable and that the birefringence of the core and the cladding are closely matched to reduce losses caused by connecting a planar waveguide to fiber, or by scattering.

A desirable property in an optical waveguide is high thermal stability, which is necessary so that the waveguide will survive electronic packaging and assembly processes used in manufacturing. The optical multichip module would have to survive semiconductor assembly processes such as die attach, metallization, and wire bonding. The printed circuit board would have to survive reflow soldering and rework. The optical coupler would have to survive fiber attach and assembly operations.

The ability to wet-etch the core or cladding of an optical waveguide into channels or ridges having smooth sidewalls is also a desirable property of an optical waveguide, as is the ability to form multi-layer structures by overcoating the polyimide layer with another without the first layer being affected by the solvent used in the overcoat layer.

Polyimides are known to have the thermal stability required for electronic and semiconductor applications; however, many semiconductor grade polyimides display a high optical absorbance in the near IR visible range. Since typical commercial laser and light sources emit in the near IR visible range (350 nm to 2,000 nm) a polymer having a high optical absorbance in this region is generally not desirable for use as an optical waveguide. U.S. Pat. No. 5,304,626 discloses copolyimides of BPDA, including those incorporating 6FDA and APBP, CODA, ODA, BDAF, BAAF, and FAPB, having improved solvent resistance characteristics. The only diamines specifically exemplified are APBP and CODA. The reference does not suggest the use of the copolymers as optical waveguiding materials or disclose any optical properties for the polyimides.

U.S. Pat. No. 5,317,082 discloses photodefinable photosensitive copolyimides and waveguide structures thereof having a 6FDA/BTDA dianhydride component, an aromatic diamine component having bulky methyl groups ortho to the amine, and a fluorinated co-diamine component to reduce birefringence. As the co-diamine is incorporated in the copolymer structure, the change in birefringence is greater than the change in refractive index which makes these polymers unsuitable as core/cladding pairs for many applications. Additionally, the photosensitive copolyimides have relatively higher birefringence, making them less suitable for optical waveguide applications than the polyimides of the present invention.

U.S. Pat. No. 5,108,201 discloses polyimides and copolyimides which incorporate 2,2'-bis(trifluoromethyl)-4,4'-diaminobiphenyl (TFMB) and their use as optical waveguides having a controllable core/cladding refractive index ratio. Examples are given which demonstrate the use of 6FDA/PMDA/TFMB copolymers to control the refractive index between 1.55 and 1.65. However, there are no specific examples of 6FDA/BPDA/TFMB polyimides, and there is no consideration given to matching the birefringence of the core/cladding pair or to how that would be achieved by selecting appropriate copolymer compositions.

U.S. Pat. No. 5,344,916 discloses polyimide and copolyimide films having negative birefringence for use in liquid crystal displays, and a method for controlling the negative birefringence. Copolymers of BPDA/PMDA/TFMB are used to illustrate the ability to change the negative birefringence by varying the polymer dianhydride composition. Increasing the amount of PMDA in the dianhydride component increases the negative birefringence. However, the change in birefringence is greater than the change in refractive index, which would be undesirable for a planar optical waveguide core/cladding application. There is no suggestion of the use of these polymers as optical waveguides.

A. J. Beuhler, et al.; "Fabrication of Low Loss Polyimide Optical Waveguides Using Thin-Film Multichip Module Process Technology," IEEE Transactions on Components, Packaging, and Manufacturing Technology—Part B, Vol. 18, No. 2, May 1995 discloses a wet chemical patterning process for the fabrication of low loss waveguides using photosensitive polyimides of 6FDA and BAAF which are rendered photoimageable by co-polymerizing low concentrations of a photosensitizer and alkylated photocrosslinking group into the polymer backbone. The refractive index of the polyimides can be varied for core/cladding pairs by replacing aliphatic hydrogen atoms in the polyimide with fluorine atoms by varying the ratio of methylated to fluoromethylated diamines in the reaction mixture.

T. C. Kowalczyk, et al., "Loss Mechanisms in Polyimide Waveguides", J. Appl. Phys. 76(4):2505 (15 Aug. 1994) discloses waveguide losses in thin film polyimides as a function of cure cycle and structure in polyimides of 6FDA/APBP, 6FDA/BDAF, and 6FDA/BAAF/R (R=alkylated photocross-linking group). Increased fluorination did not have a predictable effect on birefringence. In the polyimides having no R group increased fluorination was reported to decrease both the refractive index and the birefringence, however, the 6FDA/BAAF/R polyimide had lower refractive index but higher birefringence than the non-alkylated polyimides.

A. J. Beuhler, et al, "Optical Polyimides for Single Mode Waveguides", SPIE, Vol. 1849, Optoelectronic Interconnects, pp. 92–103 (1993) discloses the synthesis and optical characterization of fluorinated polyimide systems with potential use in passive waveguides and electro-optic devices and reviews the effect of fluorination on optical properties such as refractive index, birefringence, and near-infrared absorbance in terms of optical performance requirements. Synthetic methods of tuning the parameters and refractive index in order to achieve appropriate core/cladding differentials is discussed. The polyimides disclosed are BPDA/pPDA; BPDA/APBP; BPDA/FAPB; 6FDA/APBP; and 6FDA/BDAF. The fluorinated polyimides have the disadvantages of poor solvent resistance and difficult fabrication. Photochemical crosslinking was used to increase solvent resistance and introduce patternability into fluorinated polyimides. At paragraph 3 of the Introduction it is stated that rigid rod polyimides, such as those based on biphenyldianhydride, are anisotropic and also tend to be highly colored due to intramolecular charge transfer complexes and that these properties lead to substantial optical, absorption and scattering losses.

T. C. Kowakczyk, et al., "Guest-Host Crosslinked Polyimides," J. Appl. Phys. 78 (10):5876 (15 Nov. 1995) discloses waveguides in which 6FDA/BAAF/R is used as a cladding with a 6FDA/BAAF/R core doped with DADC or DCM and illustrates how the refractive index of the core material is raised by incorporating an NLO dopant. The dopant may cause losses in the form of scattering sites and absorption tails.

T. C. Kowalczyk, et al., "Guest-Host Crosslinked Polyimides for Integrated Optics," ACS Symp. Ser. (1995), 601 (Polymers for Second-Order Non-Linear Optics) p.381–400 reports poling issues related to multi-layer films which incorporate 6FDA/BAAF/R and also points out a problem of increased optical loss due to long absorption tails in the chromophore.

See also Beuhler, et al., "Optical Waveguides from Photosensitive Polyimides", Extended Abstracts, 5th International Conference Polyimides, Nov. 2–4, 1994.

Meinhardt, et al., "Characterization of Thermally Stable Dye-Doped Polyimide Based Electrooptic Materials," Mater. Res. Soc. Symp. Proc. (1994), 328 (Electrical, Optical, And Magnetic Properties Of Organic Solid State Materials), p. 467–475. 6FDA/BAAF/R and 6FDA/TFMB/R, where R is an alkylated aromatic crosslinking species whose structure is not disclosed, were doped with oxazoles and the absorptive losses were measured. Thermal decomposition of certain oxazole-doped polyimides were greater than for the undoped polyimides.

Meinhardt, et al., "Characterization of Crosslinked Electrooptic Polyimides," Proc. SPIE-Int. Soc. Opt. Eng. (1994), 2143 (Organic, Metallo-Organic and Polymeric Materials for Nonlinear Optical Applications) p. 110–16, discusses the electro-optical properties of doped 6FDA/BAAF/R polyimides, doped with DCM and DADC, a bis (carbazole) analog of DCM and two oxazoles. Absorption losses with the different dopants are reported.

P. A. Cahill, et al., "Polyimide-based Electrooptic Materials", Nonlinear Optical Properties Of Organic Materials VI, SPIE Vol. 2025, pp. 48–55 (1993). The effects of doping 6FDA/BAAF/R and 6FDA/TFMB/R polyimides (R=alkylated photocrosslinking group) on the dielectric constant, refractive index and coefficient of thermal expansion of the polyimides are presented. Azole dyes were used as dopants.

Beuhler, et al., "Polyimide Optical Waveguides," Organic Thin Films For Photonic Applications, 1993 Technical Digest Series, Vol. 17, p. 254–257. The paper discusses the interest in making planar waveguides from polyimides and indicates that most aromatic polyimide compositions that exhibit low optical loss are based on 6FDA. It also states that rigid rod polyimides such as those based on biphenyl dianhydride exhibit outstanding thermal-mechanical properties such as low thermal expansion and high glass transition temperature making them attractive for semiconductor coating applications, but that many of the rigid rod polyimides have the disadvantages of being highly anisotropic and intrinsically colored due to intramolecular charge-transfer complexes that form between the electron rich diamine and electron deficient dianhydride which leads to substantial optical loss. The effect of polyimide structure on birefringence is shown in FIG. 1 for BPDA/pPDA; BPDA/APBP; BPDA/FAPB; 6FDA/APBP; and 6FDA/BDAF and 6FDA/BAAF/R. In paragraph 2 on page 2 it states that 6FDA/BDAF and 6FDA/BAAF/R have the highest transparency in the near infrared visible and should produce the lowest attenuation waveguides provided that scattering losses are low, but they may suffer from poor solvent resistance and lower thermomechanical properties. It states that in these cases, co-polymerization with rigid monomers can be used to improve thermomechanical properties. This is repeated in the last sentence of the article; however, there are no examples of making and testing such polyimides. C. Feger, et al., "Polyimide Waveguiding at 830 nm," Ann. Tech. Soc. Conf. Soc. Plast. Eng. 49th, p. 1594–1597 (1991) describes waveguiding properties of some polyimides which contain one or two hexafluoroisopropylidene groups in the backbone, including PMDA-6FDAm, BTDA-6FDAm, and BPDA-6FDAm (6FDAm is the diamine referred to herein as BAAF). The behavior of the optical losses such as scattering losses caused by birefringence of the polyimides at different wavelengths and temperatures was measured.

NASA Technical Support Package LAR-13539 and U.S. Pat. Nos. 4,595,548 and 4,603,061 disclose transparent aromatic polyimides derived from various dianhydrides bridged by a flexible "separator" moiety, including 6FDA, ODPA and BDSDA, and ether or thioether bridged diamines; the use of BPDA or other unbridged dianhydrides or diamines is not disclosed. The polyimides were evaluated as second-surface mirror coatings on thermal control systems.

Stoakley, et. al., J. Appl. Polym. Sci., Vol. 51, 1479–83 (1994), report copolymers of fluorinated dianhydrides and BPDA with a fluorinated diamine, DABTF which were prepared as films and composite laminates for use as aircraft matrix resins. The copolymers were found to have decreased solubility and excellent optical transparency, although incorporation of BPDA increased the UV cutoff and decreased the percent transmission slightly. There is no suggestion of using the copolyimides for waveguiding.

U.S. Pat. No. 4,952,669 discloses copolyimides and copolyamic acids incorporating 2-(3-aminophenyl)-2-(4-aminophenyl)hexafluoropropane (3,4'-6F diamine) having improved solubility characteristics, low dielectric constants and improved thermal flow properties as a consequence of the metalpara positioning of the amino groups on the diamine including BPDA/6FDN3,4'-6F Diamine. The reference does not disclose or suggest the use of the copolymers as optical waveguiding materials.

U.S. Pat. No. 4,978,738 discloses high molecular weight (>90,000) polyimides of BAAF diamines and BPDA, ODPA, and BTDA dianhydrides which optionally contain a suitable amount of 6FDA, but it does not suggest their use as waveguiding materials or how polymer compositions having useful properties in waveguiding structures would be selected.

U.S. Pat. No. 4,954,609 discloses a process for producing polyamic acids and polyimides having a controllable molecular weight and molecular weight distribution wherein at least one of the diamine or dianhydride contains a fluorinated bridging group. There is no suggestion of possible use of the polyimides as waveguides or in waveguide structures.

U.S. Pat. No. 5,025,089 discloses copolyimides of BAAF and at least one other diamine with pyromellitic dianhydride (PMDA) and at least one other dianhydride having a diaryl nucleus which are soluble in organic solvents such as methyl ethyl ketone and N-methyl pyrrolidone (NMP) and which display improved mechanical and electrical properties. There is no suggestion of using these polyimides as optical waveguides. Furthermore, the use of PMDA in a copolyimide will cause an undesirable change in birefringence making these copolymers unsuitable for optical waveguide structures.

U.S. Pat. No. 5,049,649 discloses high molecular weight colorless optically clear films consisting essentially of BAAF or its meta-isomer and 6FDA. There is no consideration given to forming waveguides or waveguide structures, or to adjusting refractive index and birefringence by forming suitable copolymers.

U.S. Pat. No. 5,089,593 discloses polyimides useful in microelectronic devices which incorporate 4,4'-bis(4-amino-2-(trifluoromethyl)phenoxybiphenyl. The reference does not disclose any optical properties of these polyimides or suggest the use of these polyimides as optical waveguiding materials.

U.S. Pat. No. 5,354,839 discloses polyimides incorporating fluorinated bis(3-aminophenoxy)arene moieties. An example of a 6FDA/BPDA copolymer is given, however, there is no suggestion of its use as a waveguiding material or that it would form a useful component of a core/cladding pair of waveguiding materials.

U.S. Pat. No. 5,326,600 discloses polyimides incorporating a substituted diaminobiphenyl moiety and their use as an alignment film in liquid crystal devices. There is no suggestion that it would be advantageous to form a copolymer or any suggestions that the polymers disclosed might have utility as an optical waveguide or as a component of a core/cladding pair of waveguiding materials.

The present invention provides thermally stable, low optical loss, low optical absorbance, polyimide waveguides.

The polyimides of the present invention provide 6FDA/DIAMINE, BPDA/DIAMINE, and 6FDA/BPDA/DIAMINE polyimide optical waveguide core/cladding polymer pairs in which both the refractive index and birefringences of the core and cladding can be controlled. Birefringence is a measure of the optical anisotropy (i.e., wherein the properties are different in one direction, for example in-plane, than they are in another direction, for example, out-of-plane). The typical rigid rod polyimides that are generally preferred for semi-conductor applications are highly oriented in the plane of the coating and thus exhibit a high birefringence. High birefringence measurements correspond to high optical scattering losses and irreproducibility of the refractive index and are undesirable for optical waveguides (for which the ideal birefringence is 0.0). Thus, it is desirable to select polyimides having relatively low birefringence, preferably of less than about 0.025, for planar waveguide applications.

It is also desirable to be able to adjust the refractive indices of the core and cladding to contain the optical signal without substantially changing the birefringence and increasing light scattering. The refractive index of the polyimides of the present invention can be adjusted by substituting BPDA for 6FDA in the polyimide composition. This provides core-cladding pairs in which refractive indices of the core and cladding are adjusted and birefringences of the core and cladding are controlled to provide the desired waveguiding conditions.

It is surprising and unexpected that the refractive index and birefringence of a 6FDA/BPDA/DIAMINE optical waveguide core or cladding could be controlled by replacing 6FDA with BPDA in the core and cladding so that the change in the birefringences of the core and cladding polyimides is less than the difference in the respective TM refractive indices of the core and cladding. Polyimides containing BPDA generally are thought to have higher birefringence. Thus, it is unexpected that substituting BPDA for 6FDA in the polyimides does not produce birefringence levels that would be undesirable for waveguide uses.

The BPDA-containing polyimides of the present invention are solvent resistant and can be fabricated into multilayer structures by overcoating one polyimide layer over another which provides an advantage over solvent sensitive polyimides which may be affected by the solvent used to overlay a layer of polyimide or other material.

It is an object of this invention to provide a core/cladding pair of materials forming a waveguide which have closely matched physical and mechanical properties. Typical waveguide operating conditions may involve significant departures from ambient conditions in demanding applications where temperature and humidity vary widely. In order for the waveguide to have optimum performance under a variety of operating conditions, it is necessary that the glass transition temperature, moisture absorption, coefficient of thermal expansion, and modulus of the core and cladding materials be closely matched. While it is known to change the refractive index by forming copolymers, this has not been demonstrated with retention of physical and mechanical properties. The present invention provides core/cladding pairs of materials having closely matched physical and mechanical properties.

SUMMARY OF THE INVENTION

The present invention relates to optical waveguides in which the refractive indices and birefringences of both the core and cladding are controllable. The present invention also provides optical waveguides which have low optical losses, low optical absorbance, increased solvent resistance, and high thermal stability.

The invention provides a planar optical waveguide comprising:

(a) a core for light transmission therethrough comprising a polyimide having repeating units of the formula (I):

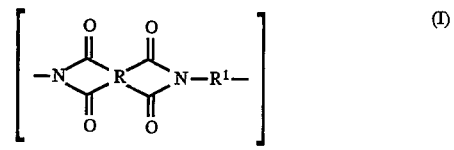

wherein
R comprises from about 0 to about 100 mole percent

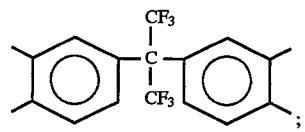

and from about 100 to about 0 mole percent;

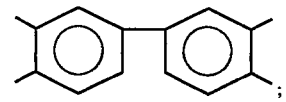

(b) a cladding comprising a polyimide having repeating units of the formula (II):

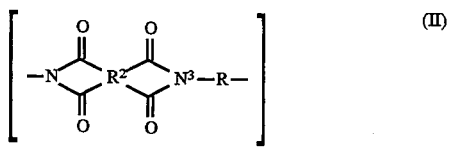

wherein
$R^2$ comprises from about 0 to about 100 mole percent

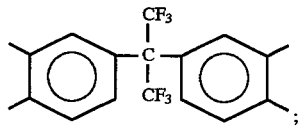

from about 100 to about 0 mole percent

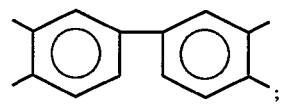

wherein $R^1$ and $R^3$ are independently selected from divalent hydrocarbon radicals; wherein the refractive index of the core is greater than the refractive index of the cladding; and wherein the difference between the birefringence of the core and the birefringence of the cladding is less than the difference between the TM refractive index of the core and the TM refractive index of the cladding; with the proviso that the core polyimide (I) and the cladding polyimide (II) are different and that at least one of the core polyimide (I) and the cladding polyimide (II) is a copolymer containing at least about 1 mole percent 3,3',4,4'-tetracarboxybiphenyl dianhydride moiety.

DETAILED DESCRIPTION OF THE INVENTION

Included in the invention is a planar optical waveguide comprising:

(a) a core for light transmission therethrough comprising a polyimide having repeating units of the formula (I):

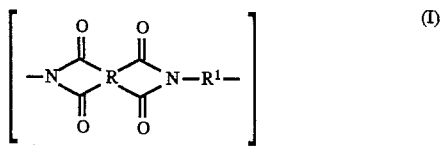

wherein
R comprises from about 0 to about 100 mole percent:

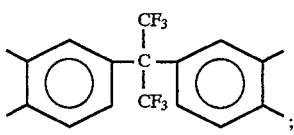

and from about 100 to about 0 mole percent:

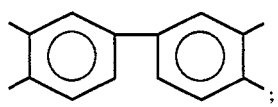

(b) a cladding comprising a polyimide having repeating units of the formula (II):

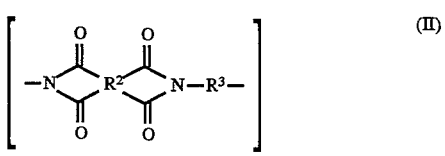

wherein
$R^2$ comprises from about 0 to about 100 mole percent:

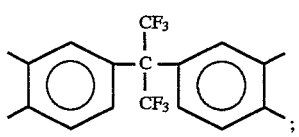

and from about 100 to about 0 mole percent:

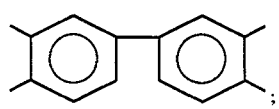

and wherein $R^1$ is at least one aromatic diamine and $R^3$ is at least one aromatic diamine which may be the same or different from $R^1$; wherein the refractive index of the core is greater than the refractive index of the cladding; and wherein the difference between the birefringence of the core and the birefringence of the cladding is less than the difference between the TM refractive index of the core and the TM refractive index of the cladding; with the proviso that the core polyimide (I) and the cladding polyimide (II) are different and that at least one of the core polyimide (I) and cladding polyimide (II) is a copolymer containing at least about 10 mole percent 3,3',4,4'-tetracarboxybiphenyl dianhydride moiety.

The invention further includes a planar optical waveguide as disclosed hereinabove wherein at least one of the core polyimide (I) and the cladding polyimide (II) is a copolymer containing at least about 25 mole percent 3,3',4,4'-tetracarboxybiphenyl dianhydride moiety.

Further included in the invention is a planar optical waveguide as disclosed hereinabove wherein at least one of the core polyimide (I) and the cladding polyimide (II) is a copolymer containing from about 1 mole percent to about 75 mole percent 3,3',4,4'-tetracarboxybiphenyl dianhydride moiety.

The present invention also includes a planar optical waveguide as disclosed hereinabove wherein at least one of the core polyimide (I) and the cladding polyimide (II) is a copolymer containing from about 10 mole percent to about 90 mole percent 3,3',4,4'-tetracarboxybiphenyl dianhydride moiety.

The present invention also includes a planar optical waveguide as disclosed hereinabove wherein at least one of the core polyimide (I) and the cladding polyimide (II) is a copolymer containing from about 10 mole percent to about 75 mole percent 3,3',4,4'-tetracarboxybiphenyl dianhydride moiety.

The present invention further includes a planar optical waveguide as disclosed hereinabove wherein at least one of the core polyimide (I) and the cladding polyimide (II) is a copolymer containing from about 25 mole percent to about 75 mole percent 3,3',4,4'-tetracarboxybiphenyl dianhydride moiety.

In a preferred embodiment, $R^1$ and $R^3$ are at least one diamine selected from the group consisting of 4,4'-bis(p-aminophenoxy)biphenyl (APBP); 2,2-bis(4-aminophenyl) hexafluropropane (BAAF); 4,4'-oxydianiline (ODA); 1,3-bis(4-aminophenoxy)benzene(1,3,4-APB); 2,2'-bis[4-(4-aminophenoxy)phenyl]hexafluoropropan (BDAF); 4,4'-bis [4-amino-2-(trifluoromethyl)phenoxy]biphenyl (FAPB); 2,2'-bis[4-[4-amino-2-(trifluoromethyl) phenoxy]phenyl) hexafluoropropane (BISAF-OFA); and 2,2'-bis (trifluoromethyl) benzidine (TFMB);

The present invention also provides a method for controlling the refractive index and birefringence in a polyimide core or cladding comprising a 6FDA/DIAMINE polyimide or a 6FDA/BPDA/DIAMINE polyimide which comprises replacing some or all of the 6FDA with BPDA in the core or cladding such that the change in the respective birefringences of the core and cladding polyimides is less than the difference in the respective TM refractive indices of the core and cladding.

Included in the invention is a method for controlling the refractive index and birefringence in an optical waveguide having:

(a) a polyimide core comprising a polyimide which is the condensation product of at least one of 6FDA and BPDA, and at least one aromatic diamine; and (b) a polyimide cladding comprising a polyimide which is the condensation product of at least one of 6FDA and BPDA, and at least one aromatic diamine, and wherein the core and cladding polyimides are different and at least one of the core polyimide or cladding polyimide contains at least about 1 mole percent BPDA, which comprises replacing 6FDA in the core polyimide or the cladding polyimide, or in both the core polyimide and the cladding polyimide, with BPDA in an amount effective to provide a change in the respective refractive indices and birefringences of the core and the cladding such that the refractive index of the core is greater than the refractive index of the cladding and the difference between the birefringence of the core and the birefringence of the cladding is less than the difference between the TM refractive index of the core and the TM refractive index of the cladding.

Also included in the invention is a method as disclosed hereinabove wherein the aromatic aliamine in the core polyimide and the aromatic diamine in the cladding polyimide are independently at least one diamine selected from the group consisting of APBP, BAAF, ODA, 1,3,4-APB, BDAF, FAPB, Bis-AF-OFA, and TFMB.

Optical waveguides of the present invention have high thermal stability, low optical loss and low optical absorbance.

Included in the present invention are the polyamic acid precursors to the polyimides of formula I and formula II.

The present invention includes the salt, carboxylic acid, or ester precursors of the polyimides of the present invention. The present invention also includes compositions which have the polyimides of the present invention in combination with the polyamic acid, salt, or ester precursors of the polyimide.

The present invention additionally includes a method for controlling the refractive index and birefringence in an optical waveguide having a polyimide core comprising a polyimide which is the condensation product of at least one of 6FDA and BPDA, and at least one aromatic diamine and a polyimide cladding comprising a polyimide which is the condensation product of at least one of 6FDA and BPDA, and at least one aromatic diamine, which comprises replacing 6FDA in the core or the cladding, or in both the core and the cladding, with BPDA in an amount effective to provide a change in the respective refractive indices and birefringences of the core and the cladding polyimides such that the refractive index of the core is greater than the refractive index of the cladding and the difference between the birefringence of the core and the birefringence of the cladding is less than the difference between the TM refractive index of the core and the TM refractive index of the cladding.

Optionally, the dianhydride component R in formula I and the dianhydride component $R^2$ in formula II can each contain up to about 50 mole percent of an additional dianhydride with up to about 25 mole percent of additional dianhydride component being preferred. A preferred additional dianhydride is 3,3',4,4'-tetracarboxybenzophenone (BTDA).

The divalent hydrocarbon moieties $R^1$ in formula I and $R^3$ in formula II may be the same or different. The divalent hydrocarbon moieties, $R^1$ and $R^3$ in Formulas I and II, are individually selected from an aliphatic or an aromatic moiety. The aliphatic moiety is characterized by a straight or branched-chain hydrocarbon, such as, for example, methylene, ethylene, propylene, tetramethylene, hexamethylene, octamethylene, nonamethylene, decamethylene, dodecamethylene, and the like, which can be unsubstituted or substituted with one or more halides such as fluorine, or lower alkyl groups such as, for example, 2,2,4-trimethylhexamethylene, 2,2-dimethylpropylene, and the like. The aliphatic moiety can also incorporate segments such as, for example, xylene diamine or bis(aminopropyl)-terminated polydimethylsiloxane.

The aromatic moiety is characterized by a single aromatic ring or by two or more such rings which are fused together or are joined by one or more stable linkages, such as a covalent carbon-carbon bond, oxy, sulfonyl, carbonyl, alkylene, fluoroalkylene, and the like. The aromatic moiety can include divalent moieties of benzene, naphthalene, phenanthrene, antracene, and the like. Further, the aromatic rings can be unsubstituted or substituted, for example, with one or more halide, lower alkyl, fluoroalkyl, or aromatic groups. The polyamic acid precursors of the polyimides of Formulas I and II are typically made from aromatic dianhydrides, including their ester and acid forms, and at least one aromatic diamine. Suitable aromatic diamines include, for example, 4,4'-bis(p-aminophenoxy)biphenyl (APBP); 2,2-bis(4-aminophenyl)hexafluoropropane (BAAF); 4,4'-oxydianiline (ODA); 1,3-bis(4-aminophenoxy)benzene (1,3,4-APB); 2,2'-bis[4-(4-aminophenoxy)phenyl]-hexafluoropropane (BDAF); 4,4'-bis[4-amino-2-(trifluoromethyl)phenoxy]-phenyl] hexafluoropropane (FAPB); 2,2'-bis(trifluoromethyl) benzidine (TFMB); 2,3,5,6-tetramethyl-1,4-phenylene diamine (DMDE); 2,4,6-trimethyl-1,3-phenylene diamine (MEDA), and 3,3',5,5'-tetramethylbenzidine (TMB).

The polyimides of the present invention can be prepared as the polycondensation product of components comprising 6FDA and/or BPDA and at least one diamine.

The following abbreviations as used herein are defined as follows:

| ABBREVIATION | FULL NAME |
|---|---|
| 6FDA | 2,2-bis(3,4-dicarboxyphenyl)hexafluoropropane dianhydride |
| BPDA | 3,3',4,4'-tetracarboxybiphenyl dianhydride |
| APBP | 4,4'-bis(p-aminophenoxy)biphenyl |
| BTDA | 3,3',4,4'-tetracarboxybenzophenone dianhydride |
| BAAF | 2,2'-bis[4-aminophenyl)hexafluoropropane |
| ODA | 4,4'-oxydianiline, also called 4,4'-diaminophenyl-ether |
| 1,3,4-APB | 1,3-bis(4-aminophenoxy)benzene |
| BDAF | 2,2'-bis[4-(4-aminophenoxy)phenyl]hexafluoropropane |
| FAPB | 4,4'-bis[4-amino-2-(trifluoromethyl)phenoxy]biphenyl |
| Bis-AF-OFA | 2,2'-bis[4-[4-amino-2-(trifluoromethyl)phenoxy]phenyl]hexafluoropropane |
| TFMB | 2,2'-bis(trifluoromethyl)benzidine, also called ABL-21 |
| DMDE | diaminodurene or 2,3,5,6-tetramethyl-1,4-phenylene diamine |
| MEDA | 2,4,6-trimethyl-1,3-phenylenediamine |
| TBM | 3,3',5,5'-tetramethylbenzidine |
| PMDA | pyromellitic acid dianhydride |
| GBL | gamma-butyrolactone |
| NMP | N-methylpyrrolidone |

As used herein, the polyamic acids of the present invention are the precursors to the cured polyimide of the present invention. In addition, the composition of this invention is found in several forms. When the polymer is first prepared, it is essentially in the polyamic acid form. However, the polymer is in a dynamic state and some polyimide may be present. Likewise, after the polyamic acid is cured to the polyimide form, some polyamic acid may be present. Accordingly, it is to be understood that although the polymer may be primarily in one form or another, some degree of both forms may be present.

In still greater detail, the polyamic acids of the present invention are generally prepared in accordance with known polycondensation methods which are described in detail in *Polyimides-Thermally Stable Polymers,* Plenum Publishing (1987), incorporated herein by reference. The total diamine and total dianhydride components are present in a ratio of approximately 1:1. However, by using an excess of diamine or dianhydride in the reaction mixture (preferably ranging from about 0.9:1 to about 1.1:1.0), the chain length of the product can be adjusted. Further, the chain length can be restricted by adding a predetermined quantity of a monoamine or a dicarboxylic acid anhydride to the reaction mixture. The reaction generally takes place at from about minus 10° C. to about 100° C.

The solution of polyamic acid is spin-coated onto a substrate, such as a silicon wafer. The solution of polyamic acid may be diluted before it is spread on the substrate. The degree of dilution of the solution of polyamic acid is based on the thickness requirement of the final coating, the viscosity and solids content of the solution, and the spin curve data for the polyamic acid. Solutions of the polyamic acid generally range from about 5 to about 50 weight percent, preferably, from about 10 to about 40 weight percent, depending upon the molecular weight, to provide the proper viscosity for application to the substrate by spin-coating.

The spin curve data can be obtained by spin-coating the polyamic acid onto the substrate at various spin speeds, curing the polyamic acid, measuring the resulting thickness, and plotting thickness versus spin speed. The diluted solution is generally filtered before further processing.

The polyamic acid solution can be applied either statically or dianamically. In static application, the polyamic acid solution is dispensed to a nonrotating substrate and spread across the surface by spinning. In dynamic application, the polyamic acid solution is dispensed to a rotating substrate. In either case, the substrate is spun at a spin speed which is determined from the spin curve for the final coating thickness required.

Alternatively, the polyamic acid can be applied to suitable carriers, or substrates, by other conventional methods, which can include, but are not necessarily limited to, dipping, brushing, casting with a bar, roller-coating, spray-coating, dip-coating, whirler-coating, cascade-coating, curtain-coating, or other methods.

Substrates can be any material that is not decomposed in the high temperatures that are required for processing. Examples of suitable carriers, or substrates, are: plastics; metal and metal alloys, such as aluminum, copper, and the like; semi metals; semiconductors, such as Si, Ge, GaAs, glass, ceramics; and other inorganic materials, for example, silicon oxide, silicon nitride, indium tin oxide, and the like. Further, the substrate can be dried (dehydration) to remove moisture on the surface of the substrate before the application of the polyamic acid.

Generally, polyimides are made by mixing a diamine component and a dianhydride component in a compatible solvent to form a solution of polyamic acid. The polyamic acid is then imidized by either chemical or thermal methods to form a polyimide, and the polyimide may be isolated.

A composition of the polyimide of the present invention in solution solvent is spread on a substrate to form a coating. Multiple layers of polyimide are used to form a structure having multiple layers of waveguides.

The structure of the optical waveguide of the present invention has at least one layer comprising a core guiding material which is situated within a cladding material. Multiple layers of waveguides can be fabricated onto a single printed circuit board. The polyimides of the present invention are useful in the optical waveguide as (1) a core material; (2) a cladding material; or (3) both the core material and the cladding material, so long as the core material has a higher refractive index than the cladding material. Further, the refractive index and birefringence of the polyimides of the present invention can be controlled by changing the composition of the polyimide to produce the desired optical properties.

The polyimide core of Formula I and the polyimide cladding of Formula II can be used as core-cladding pairs in an optical waveguide or they can independently be used as the core or cladding in combination with other waveguide materials. In other words, the core material can be a material, for example, polymer, glass, $SiO_2$, silicone gel, epoxy, and the like. In that case, a polyimide of the present invention which has a lower refractive index than the core material can be the cladding. On the other hand, the core material can be a polyimide of the present invention, and the cladding material can be a different material having a lower refractive index, for example, another polymer, air, vacuum, glass, silicone gel, epoxy, PMMA, $SiO_2$, and the like. Alternatively, both the core and the cladding materials can be polyimides of the present invention wherein the composition of the respective polyimides is such that the core polyimide has a higher refractive index than the cladding polyimide.

As indicated above, the polyimides of the present invention have the advantage that they can be etched by conventional photoresist lithography methods such as those described in U.S. Pat. No. 5,304,626 incorporated herein by reference. Either the core or the cladding can be wet-etched into channels or ridges as needed.

The polyimides of the present invention can also be doped with electro-optic or non-linear optical chromophores using a guest/host approach, i.e., the polyimide serves as an inert matrix for an active dopant. The effect of the dopant is twofold. The dopant increases the refractive index so that selective waveguiding takes place, i.e., the doped areas guide and the undoped areas serve as the cladding. In addition, the dopant adds electro-optic or non-linear optical activity so that the doped polymers response to an electromagnetic field is second order or non-linear. These types of guest/host doped polymers are known to those skilled in the art and are used in the construction of light modulators and electro-optic switches. Examples of electro-optic dopants, including but are not limited to, Disperse Red 1, Eriochrome Black T, Erythrosin, p-nitro-aniline, DADC, and DCM.

The following examples will serve to illustrate certain embodiments of the invention disclosed herein. These examples should not, however, be construed as limiting the scope of the invention as there are many variations which may be made thereon without departing from the spirit of the disclosed invention, as those skilled in the art will recognize.

EXAMPLES

Unless otherwise indicated, the polyimide compositions are mole percent. The inherent viscosity of polymers was determined from 0.5% w/v solution of the polymer in NMP at 25° C.

Glass Transition Temperature Measurements

Polymers made according to the examples were cast on glass plates and cured to 350° C. under nitrogen. The polymer films were removed and the glass transition temperature ($T_g$) of the polymers was measured by differential scanning calorimetry. A temperature ramp rate of 20° C./min was used for all determinations unless otherwise specified.

Refractive Index Measurements

Refractive indices for all of the polymer coatings were made using a Metricon PC-2000 prism coupler modified with a He-Ne (633 nm) and Amoco YAG Microlaser (1064 nm). In plane (TE) and out of plane (TM) refractive indices were determined by using a polarizer to orient the laser light. The TM measurements were performed in the instrument's manual mode to improve accuracy.

The birefringence is the difference between the TE and the TM refractive indices.

Example 1

6FDA/APBP

A solution of (6FDA/APBP) amic acid (Ultradel 4212®, available from Amoco Chemical, Naperville, Illinois) was cast on a silicon wafer by spin coating, and imidized by a heat treatment up to a maximum temperature of 300° C. to produce a coating having a thickness of 5.2 microns. The refractive index determined by prism coupling was found to be 1.613 in the TE mode and 1.604 in the TM mode giving a birefringence of 0.009. The refractive indices and birefringence are reported in Table I.

Example 2

0.75-6FDA/0.25 BPDA/APBP

A solution of 0.75-6FDA/0.25 BPDA/APBP amic acid (Ultradel 3312®, available from Amoco Chemical) was cast on a silicon wafer by spin coating, and imidized by a heat treatment up to a maximum temperature of 300° C. to produce a coating having a thickness of 2.3 microns. The refractive index was determined in the same manner as in Example 1 and is reported in Table I.

Example 3

0.5-6FDA/0.5 BPDA/APBP

A solution of polyamic acid was prepared at room temperature by combining 3.014 grams of 2,2'-bis(3,4-dicarboxyphenyl)-hexafluoropropane dianhydride (6FDA), 1.994 grams of 3,3',4,4'-tetracarboxybiphenyl dianhydride (BPDA), 5.095 grams of 4,4'-bis(4-aminophenoxy)biphenyl (APBP) and 56.7 grams of N-methylpyrrolidone (NMP) with good mixing. The amic acid was cast on a silicon wafer by spin coating, and imidized by a heat treatment up to a maximum temperature of 300° C. to produce a coating having a thickness of 2.5 microns. The refractive index was determined in the same manner as in Example 1 and is reported in Table I.

Example 4

0.25-6FDA/0.75 BPDA/APBP

A solution of polyamic acid was prepared at room temperature by combining 2.449 grams of 6FDA, 4.728 grams of BPDA, 7.893 grams of APBP and 60.7 grams of NMP with good mixing. A portion of the amic acid solution was diluted to 9% solids, then cast on a silicon wafer by spin coating, and imidized by a heat treatment up to a maximum temperature of 300° C. to produce a coating having a thickness of 2.2 microns. The refractive index was determined in the same manner as in Example 1 and is reported in Table I.

Example 5

BPDA/APBP

A solution of polyamic acid was prepared at room temperature by combining 4.728 grams of BPDA and 7.893 grams of APBP and 60.7 grams of NMP with good mixing. A portion of the amic acid solution was diluted to 9% solids, then cast on a silicon wafer by spin coating, and imidized by a heat treatment up to a maximum temperature of 300° C. to produce a coating having a thickness of 4.6 microns. The refractive index was determined in the same manner as in Example 1 and is reported in Table I.

Example 6

0.75-6FDA/0.25 BPDA/ODA

A solution of polyamic acid was prepared at room temperature by combining 5.490 grams of 6FDA, 1.212 grams of BPDA, and 3.365 grams of 4,4'-oxydianiline (ODA) and 56.7 grams of NMP with good mixing. The amic acid solution was diluted to 13% solids, then cast on a silicon wafer by spin coating, and imidized by a heat treatment up to a maximum temperature of 300° C. to produce a coating having a thickness of 2.4 microns. The refractive index was determined in the same manner as in Example 1 and is reported in Table I.

Example 7

0.75-6FDA/0.25 BPDA/0.5 APBP/0.5 ODA

A solution of polyamic acid was prepared at room temperature by combining 4.821 grams of 6FDA, 1.064 grams of BPDA, 1.449 grams of ODA, 2.772 grams of APBP, and 66.8 grams of NMP with good mixing. The amic acid was cast on a silicon wafer by spin coating, and imidized by a heat treatment up to a maximum temperature of 300° C. to produce a coating having a thickness of 2.6 microns. The refractive index was determined in the same manner as in Example 1 and is reported in Table I.

Example 8

0.75-6FDA/0.25 BPDA/1,3,4-APB

A solution of polyamic acid is prepared at room temperature by combining 5,490 grams of 6FDA, 1.212 grams of BPDA, 4.913 grams of 1,3-bis(4-aminophenoxy)benzene (1,3,4-APB) and 65.8 grams of NMP with good mixing. The amic acid solution is diluted to 13% solids, then cast on a silicon wafer by spin coating, and imidized by a heat treatment up to a maximum temperature of 300° C. to produce a coating

Example 9

0.75-6FDA/0.25 BPDA/BDAF

A solution of polyamic acid was prepared at room temperature by combining 5.416 grams of 6FDA, 1.193 grams of BPDA, 8.406 grams of 2,2'-bis[4-(4-aminophenoxy)phenyl]hexafluoropropane (BDAF) and 60.2 grams of NMP with good mixing. The amic acid was cast on a silicon wafer by spin coating, and imidized by a heat treatment up to a maximum temperature of 300° C. to produce a coating having a thickness of 3.2 microns. The refractive index was determined in the same manner as in Example 1 and is reported in Table I.

Example 10

0.75-6FDA/0.25 BPDA/FAPB

A solution of polyamic acid was prepared at room temperature by combining 5.499 grams of 6FDA, 1.211 grams of BPDA, 8.304 grams of 4,4'-bis[4-amino-2-(trifluoromethyl)phenoxy]biphenyl (FAPB) and 60.4 grams of NMP with good mixing. The amic acid was cast on a silicon wafer by spin coating, and imidized by a heat treatment up to a maximum temperature of 300° C. to produce a coating having a thickness of 2.9 microns. The refractive index was determined in the same manner as in Example 1 and is reported in Table I.

Example 11

0.75-6FDA/0.25 BPDNB is -AF-OFA

A solution of polyamic acid was prepared at room temperature by combining 4.722 grams of 6FDA, 1.040 grams of BPDA, 9.251 grams of 2,2'-bis[4-[4-amino-2-(trifluoromethyl)phenoxy]phenyl]hexafluoropropane (Bis-AF-OFA) and 56.7 grams of NMP with good mixing. The amic acid solution was diluted to 13% solids, then cast on a silicon wafer by spin coating, and imidized by a heat treatment up to a maximum temperature of 300° C. to produce a coating having a thickness of 2.7 microns. The refractive index was determined in the same manner as in Example 1 and is reported in Table I.

Example 12

6FDA/BAAF

A solution of polyamic acid was prepared at room temperature by combining 8.577 grams of 6FDA, 6.441 grams of 2,2'-bis(4-aminophenyl)hexafluoropropane (BAAF) and 60.6 grams of NMP with good mixing. The amic acid solution was cast on a silicon wafer by spin coating, and imidized by a heat treatment up to a maximum temperature of 300° C. to produce a coating having a thickness of 2.5 microns. The refractive index was determined in the same manner as in Example 1 and is reported in Table I.

Example 13

0.75-6FDA/0.25 BPDA/BAAF

A solution of polyamic acid was prepared at room temperature by combining 6.762 grams of 6FDA, 1.490 grams of BPDA, 6.766 grams of BAAF and 62.1 grams of NMP with good mixing. The amic acid solution was cast on a silicon wafer by spin coating, and imidized by a heat treatment up to a maximum temperature of 300° C to produce a coating having a thickness of 2.2 microns. The refractive index was determined in the same manner as in Example 1 and is reported in Table I.

Example 14

0.5-6FDA/0.5 BPDA/BAAF

A solution of polyamic acid was prepared at room temperature by combining 4.755 grams of 6FDA, 3.138 grams of BPDA, 7.127 grams of BAAF and 60.7 grams of NMP with good mixing. The amic acid solution was cast on a silicon wafer by spin coating, and imidized by a heat treatment up to a maximum temperature of 300° C. to produce a coating having a thickness of 2.4 microns. The refractive index was determined in the same manner as in Example 1 and is reported in Table I.

Example 15

0.25-6FDA/0.75 BPDA/BAAF

A solution of polyamic acid was prepared at room temperature by combining 2.521 grams of 6FDA, 4.970 grams of BPDA, 7.529 grams of BAAF and 60.9 grams of NMP with good mixing. The amic acid solution was cast on a silicon wafer by spin coating, and imidized by a heat treatment up to a maximum temperature of 300° C. to produce a coating having a thickness of 2.5 microns. The refractive index was determined in the same manner as in Example 1 and is reported in Table I.

Example 16

BPDA/BAAF

A solution of polyamic acid was prepared at room temperature by combining 7.036 grams of BPDA, 7.978 grams of BAAF and 60.3 grams of NMP with good mixing. The amic acid solution was cast on a silicon wafer by spin coating, and imidized by a heat treatment up to a maximum temperature of 300° C. to produce a coating having a thickness of 3.0 microns. The refractive index was determined in the same manner as in Example 1 and is reported in Table I.

Example 17

6FDA/TFMB

A solution of polyamic acid was prepared at room temperature by combining 8.716 grams of 6FDA, 6.283 grams of 2,2'-bis(trifluoromethyl)benzidine (TFMB) and 60.5 grams of NMP with good mixing. The amic acid solution was cast on a silicon wafer by spin coating, and imidized by a heat treatment up to a maximum temperature of 300° C. to produce a coating having a thickness of 2.8 microns. The refractive index was determined in the same manner as in Example 1 and is reported in Table I.

Example 18

0.75-6FDA/0.25 BPDA/TFMB

A solution of polyamic acid was prepared at room temperature by combining 6.893 grams of 6FDA, 1.518 grams of BPDA, 6.608 grams of TFMB and 61.1 grams of NMP with good mixing. The amic acid solution was diluted to 10.9% solids, then cast on a silicon wafer by spin coating, and imidized by a heat treatment up to a maximum temperature of 300° C. to produce a coating having a thickness of 2.1 microns. The refractive index was determined in the same manner as in Example 1 and is reported in Table I.

Example 19

0.5-6FDA/0.5 BPDA/TFMB

A solution of polyamic acid was prepared at room temperature by combining 4.853 grams of 6FDA, 3.200 grams of BPDA, 6.967 grams of TFMB and 62.1 grams of NMP with good mixing. The amic acid solution was diluted to 10.9% solids, then cast on a silicon wafer by spin coating, and imidized by a heat treatment up to a maximum temperature of 300° C. to produce a coating having a thickness of 2.1 microns. The refractive index was determined in the same manner as in Example 1 and is reported in Table I.

Example 20

0.25 6FDA/0.75 BPDA/TFMB

A solution of polyamic acid was prepared at room temperature by combining 1.215 grams of 6FDA, 2.395 grams of BPDA, 3.476 grams of TFMB and 28.7 grams of NMP with good mixing. The amic acid solution was diluted to 10% solids, then cast on a silicon wafer by spin coating, and imidized by a heat treatment up to a maximum temperature of 300° C. to produce a coating having a thickness of 1.9 microns. The refractive index was determined in the same manner as in Example 1 and is reported in Table I.

Example 21

BPDA/TFMB

A solution of polyamic acid was prepared at room temperature by combining 7.197 grams of BPDA, 7.818 grams of TFMB and 60.6 grams of NMP with good mixing. The amic acid solution was cast on a silicon wafer by spin coating, and imidized by a heat treatment up to a maximum temperature of 300° C. to produce a coating having a thickness of 2.6 microns. The refractive index was determined in the same manner as in Example 1 and is reported in Table I.

Example 22

0.75-6FDA/0.25 BTDA/DMDE

A solution of polyamic acid was prepared at room temperature by combining 46.0 grams of 6FDA, 11.1 grams of BTDA, 22.7 grams of DMDE and 319 grams of NMP with good mixing to form a polyamic acid. The polyamic acid was chemically imidized using acetic anhydride and pyridine, precipitated and dried to give a polyimide precipitate with inherent viscosity (IV) of 1.1 dl/g.

A solution of polyimide (12% solids in GBL) was cast on a silicon wafer by spin coating, and cured by a heat treatment up to a maximum temperature of 350° C. to produce a coating having a thickness of 4.6 microns. The refractive index was determined in the same manner as in Example 1 and is reported in Table 1.

Example 23

0.6-6FDA/0.15 BPDA/0.25 BTDA/DMDE

A solution of polyamic acid was prepared at room temperature by combining 48.07 grams of 6FDA, 7.930 grams of BPDA, 14.48 grams of BTDA, 29.55 grams of DMDE, and 416 grams of NMP with good mixing to form a polyamic acid. The polyamic acid was chemically imidized by adding 58.7 grams of acetic anhydride, 25.2 grams of pyridine, 53.4 grams of toluene and 46.3 grams of NMP to the polyamic acid solution. The polyimide was precipitated with methanol, and dried in a vacuum oven at 60° C. with a nitrogen purge. The IV of the polyimide precipitate was 1.71dl/g.

A solution of polyimide was prepared at 9% solids in GBL, cast on a silicon wafer by spin coating, and cured by a heat treatment up to a maximum temperature of 300° C. to produce a coating having a thickness of 3.4 microns. The refractive index was determined in the same manner as in Example 1 and is reported in Table 1.

TABLE I

| | Refractive Index Measurements at 633 nm | | | |
|---|---|---|---|---|
| Example | TE Mode | TM Mode | Birefringence | $T_g$ °C. |
| 1 | 1.613 | 1.604 | 0.009 | 282 |
| 2 | 1.635 | 1.625 | 0.010 | 285 |
| 3 | 1.657 | 1.640 | 0.017 | 273 |
| 4 | 1.685 | 1.659 | 0.026 | 279 |

TABLE I-continued

| | Refractive Index Measurements at 633 nm | | | |
|---|---|---|---|---|
| Example | TE Mode | TM Mode | Birefringence | $T_g$ °C. |
| 5 | 1.741 | 1.673 | 0.068 | not observed |
| 6 | 1.614 | 1.603 | 0.011 | 307 |
| 7 | 1.626 | 1.614 | 0.012 | 290 |
| 9 | 1.575 | 1.568 | 0.007 | 262 |
| 10 | 1.586 | 1.577 | 0.009 | 270 |
| 11 | 1.542 | 1.537 | 0.006 | 235 |
| 12 | 1.533 | 1.528 | 0.005 | 313 |
| 13 | 1.550 | 1.543 | 0.007 | 321 |
| 14 | 1.567 | 1.559 | 0.008 | 327 |
| 15 | 1.589 | 1.581 | 0.008 | 337 |
| 16 | 1.613 | 1.604 | 0.009 | 349 |
| 17 | 1.541 | 1.533 | 0.008 | 341 |
| 18 | 1.558 | 1.549 | 0.009 | 338 |
| 19 | 1.578 | 1.566 | 0.012 | 347 |
| 20 | 1.602 | 1.581 | 0.022 | 334 |
| 21 | 1.642 | 1.590 | 0.052 | not observed |
| 22 | 1.574 | 1.545 | 0.029 | not observed |
| 23 | 1.567 | 1.526 | 0.041 | not observed |

PREPARATION OF SLAB WAVEGUIDES FROM BAAF CONTAINING POLYMERS

Example 24

The polymer of Example 16 was coated on a silicon wafer substrate by spin-coating, and heated to 350° C. to produce a five micron thick core. A cladding polymer layer was then applied by spin-coating the polymer of Example 15 and heating to 350° C. to produce a ten micron thick cladding layer on top of the core. This illustrates the formation of a two-layer slab waveguide on silicon, having a BPDA/BAAF core and 0.75 BPDA/0.25-6FDA/BAAF top cladding.

Example 25

The polymer of Example 15 was coated on a silicon wafer substrate by spin-coating, and heated to 350° C. to produce a ten micron thick cladding. The core polymer layer was then applied by spin-coating the polymer of Example 16 and heating to 350° C. to produce a five micron thick core layer on top of the cladding. The top cladding polymer layer was then applied by spin-coating the polymer of Example 15 and heating to 350° C. to produce a ten micron thick cladding layer on top of the core. This illustrates the formation of a three-layer slab waveguide on silicon, having a BPDA/BAAF core and 0.75 BPDA/0.25-6FDA/BAAF upper and lower cladding layers.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

That which is claimed is:

1. A planar optical waveguide comprising:

(a) a core for light transmission therethrough comprising a polyimide having repeating units of the formula (I):

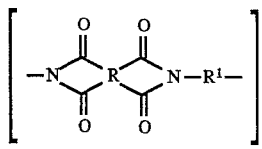

wherein

R comprises from about 0 to about 100 mole percent

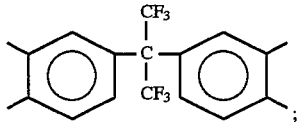

and from about 100 to about 0 mole percent;

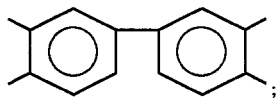

(b) a cladding comprising a polyimide having repeating units of the formula (II):

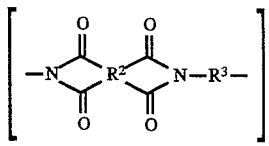

wherein $R^2$ comprises from about 0 to about 100 mole percent

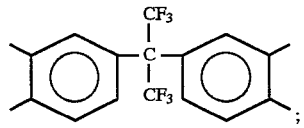

from about 100 to about 0 mole percent

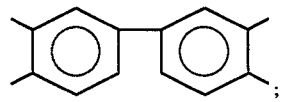

wherein $R^1$ and $R^3$ are independently selected from divalent hydrocarbon radicals; wherein the refractive index of the core is greater than the refractive index of the cladding; and wherein the difference between the birefringence of the core and the birefringence of the cladding is less than the difference between the TM refractive index of the core and the TM refractive index of the cladding, with the proviso that the core polyimide (I) and the cladding polyimide (II) are different and that at least one of the core polyimide (I) and the cladding polyimide (II) is a copolymer containing at least about 1 mole percent 3,3',4,4'-tetracarboxybiphenyl dianhydride moiety.

2. A planar optical waveguide according to claim 1 comprising:

(a) a core for light transmission therethrough comprising a polyimide having repeating units of the formula (I):

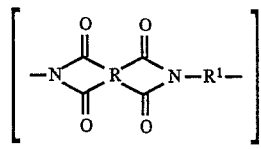

wherein

R comprises from about 0 to about 100 mole percent:

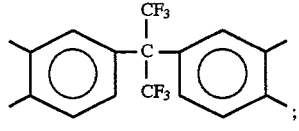

and from about 100 to about 0 mole percent:

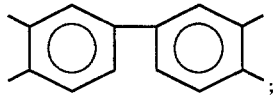

(b) a cladding comprising a polyimide having repeating units of the formula (II):

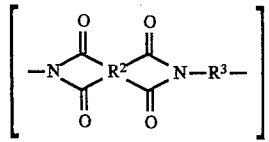

wherein $R^2$ comprises from about 0 to about 100 mole percent:

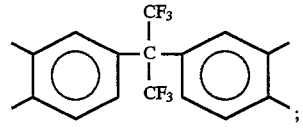

and from about 100 to about 0 mole percent:

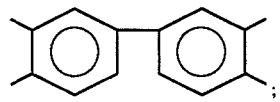

and wherein $R^1$ is at least one aromatic diamine and $R^3$ is at least one aromatic diamine which may be the same or different from $R^1$; wherein the refractive index of the core is greater than the refractive index of the cladding; and wherein the difference between the birefringence of the core and the birefringence of the cladding is less than the difference between the TM refractive index of the core and the TM refractive index of the cladding; with the proviso that the core polyimide (I) and the cladding polyimide (II) are different and that at least one of the core polyimide (I) and cladding polyimide (II) is a copolymer containing at least about 10 mole percent 3,3',4,4'-tetracarboxybiphenyl dianhydride moiety.

3. A planar optical waveguide according to claim 2 wherein at least one of the core polyimide (I) and the cladding polyimide (II) is a copolymer containing at least about 25 mole percent 3,3',4,4'-tetracarboxybiphenyl dianhydride moiety.

4. A planar optical waveguide according to claim 1 wherein at least one of the core polyimide (I) and the cladding polyimide (II) is a copolymer containing from about 1 mole percent to about 75 mole percent 3,3',4,4'-tetracarboxybiphenyl dianhydride moiety.

5. A planar optical waveguide according to claim 2 wherein at least one of the core polyimide (I) and the cladding polyimide (II) is a copolymer containing from about 10 mole percent to about 75 mole percent 3,3',4,4'-tetracarboxybiphenyl dianhydride moiety.

6. A planar optical waveguide according to claim 3 wherein at least one of the core polyimide (I) and the cladding polyimide (II) is a copolymer containing from about 25 mole percent to about 75 mole percent 3,3',4,4'-tetracarboxybiphenyl dianhydride moiety.

7. A planar optical waveguide according to claim 1 wherein $R^1$ and $R^3$ independently are at least one diamine selected from the group consisting of 4,4'-bis(p-aminophenoxy)biphenyl; 2,2-bis(4-aminophenyl) hexafluoropropane; 4,4'-oxydianiline; 1,3-bis(4-aminophenoxy)benzene; 2,2'-bis[4-(4-aminophenoxy)phenyl]hexafluoropropane; 4,4'-bis[4-amino-2-(trifluoromethyl)phenoxy]biphenyl; 2,2'-bis[4-[4-amino-2-(trifluoromethyl)phenoxy]phenyl]hexafluoropropane; and 2,2'-bis(trifluoromethyl)benzidine.

8. A planar optical waveguide according to claim 2 wherein $R^1$ and $R^3$ independently are at least one diamine selected from the group consisting of 4,4'-bis(p-aminophenoxy)biphenyl; 2,2-bis(4-aminophenyl) hexafluoropropane; 4,4'-oxydianiline; 1,3-bis(4-aminophenoxy)benzene; 2,2'-bis[4-(4-aminophenoxy)phenyl]hexafluoropropane; 4,4'-bis[4-amino-2-(trifluoromethyl)phenoxy]biphenyl; 2,2'-bis[4-[4-amino-2-(trifluoromethyl)phenoxy]phenyl]hexafluoropropane; and 2,2'-bis(trifluoromethyl)benzidine.

9. A planar optical waveguide according to claim 3 wherein $R^1$ and $R^3$ independently are at least one diamine selected from the group consisting of 4,4'-bis(p-aminophenoxy)biphenyl; 2,2-bis(4-aminophenyl) hexafluoropropane; 4,4'-oxydianiline; 1,3-bis(4-aminophenoxy)benzene; 2,2'-bis[4-(4-aminophenoxy)phenyl]hexafluoropropane; 4,4'-bis[4-amino-2-(trifluoromethyl)phenoxy]biphenyl; 2,2'-bis[4-[4-amino-2-(trifluoromethyl)phenoxy]phenyl]hexafluoropropane; and 2,2'-bis(trifluoromethyl)benzidine.

10. A planar optical waveguide according to claim 2 wherein $R^1$ and $R^3$ independently are at least one diamine selected from the group consisting of 2,2-bis(4-aminophenyl)hexafluoropropane; 2,2'-bis[4-[4-amino-2-(trifluoromethyl)phenoxy]phenyl]hexafluoropropane; 2,2'-bis[4-(4-aminophenoxy)phenyl]hexafluoropropane; and 4,4'-bis[4-amino-2-(trifluoromethyl)phenoxy]biphenyl.

11. A planar optical waveguide according to claim 3 wherein $R^1$ and $R^3$ independently are at least one diamine selected from the group consisting of 4,4'-bis(p-aminophenoxy)biphenyl; 4,4'-oxydianiline; 1,3-bis(4-aminophenoxy)benzene; and 2,2'-bis(trifluoromethyl)benzidine.

12. A planar optical waveguide according to claim 10 wherein $R^1$ and $R^3$ are 2,2-bis(4-aminophenyl)hexafluoropropane.

13. A planar optical waveguide according to claim 11 wherein $R^1$ and $R^3$ independently are at least one diamine selected from the group consisting of 4,4'-bis(p-aminophenoxy)biphenyl and 4,4'-oxydianiline.

14. A planar optical waveguide according to claim 1 wherein each of R and $R^2$ independently may optionally further contain up to about 25 mole percent of 3,3',4,4'-tetracarboxybenzophenone moiety.

15. A planar optical waveguide according to claim 1 wherein each of the core polyimide (1) and the cladding copolyimide (II) independently may optionally further contain a dopant.

16. A polyimide cladding for an optical waveguide which comprises a polyimide comprising the condensation product of 6FDA, at least about one mole percent BPDA, and at least one diamine selected from the group consisting of APBP, BAAF, and ODA.

17. The polyimide cladding of claim 16 wherein the polyimide comprises the condensation product of about 75 mole percent 6FDA, about 25 mole percent BPDA, and about 100 mole percent of a diamine selected from the group consisting of APBP and ODA.

18. The cladding of claim 16 wherein the polyimide comprises the condensation product of about 50 mole percent 6FDA, about 50 mole percent BPDA, and about 100 mole percent of a diamine selected from the group consisting of APBP and ODA.

19. The cladding of claim 16 wherein the polyimide comprises the condensation product of about 25 mole percent 6FDA, about 75 mole percent BPDA, and about 100 mole percent of a diamine selected from the group consisting of APBP and ODA.

20. A polyimide cladding for an optical waveguide which comprises a polyimide comprising the condensation product of 6FDA, at least about one mole percent BPDA, and about 100 mole percent of BAAF.

21. The cladding of claim 20 wherein the polyimide comprises the condensation product of about 75 mole percent 6FDA, about 25 mole percent BPDA, and about 100 mole percent of BAAF.

22. The cladding of claim 20 wherein the polyimide comprises the condensation product of about 50 mole percent 6FDA, about 50 mole percent BPDA, and about 100 mole percent of BAAF.

23. The cladding of claim 21 wherein the polyimide comprises the condensation product of about 25 mole percent 6FDA, about 75 mole percent BPDA, and about 100 mole percent of BAAF.

24. A method for controlling the refractive index and birefringence in an optical waveguide having (a) a polyimide core comprising a polyimide which is the condensation product of at least one of 6FDA and BPDA, and at least one aromatic diamine and (b) a polyimide cladding comprising a polyimide which is the condensation product of at least one of 6FDA and BPDA, and at least one aromatic diamine; and wherein the core and cladding polyimides are different and at least one of the core polyimide or cladding polyimide contains at least about 1 mole percent BPDA, which comprises replacing 6FDA in the core polyimide or the cladding polyimide, or in both the core polyimide and the cladding polyimide, with BPDA in an amount effective to provide a change in the respective refractive indices and birefringences of the core and the cladding such that the refractive index of the core is greater than the refractive index of the cladding and the difference between the birefringence of the core and the birefringence of the cladding is less than the difference between the TM refractive index of the core and the TM refractive index of the cladding.

25. A method according to claim 24 wherein the aromatic diamine in the core polyimide and the aromatic diamine in the cladding polyimide are independently at least one diamine selected from the group consisting of APBP, BAAF, ODA, 1,3,4-APB, BDAF, FAPB, Bis-AF-OFA, and TFMB.

26. A method according to claim 24 wherein the aromatic diamine in the core polyimide and the aromatic diamine in the cladding polyimide are independently at least one diamine selected from the group consisting of APBP, BAAF, and ODA.

* * * * *

UNITED STATES PATENT AND TRADEMARK OFFICE
CERTIFICATE OF CORRECTION

Page 1 of 2

PATENT NO.: 5,649,045

DATED: July 15, 1997

INVENTOR(S): Douglas E. Fjare, David A. Wargowski

It is certified that error appears in the above-identified patent and that said Letters Patent is hereby corrected as shown below:

| Col. | Line | |
|---|---|---|
| 4 | 13-14 | "fiuoromethylated diamines" should read --fluoromethylated diamines-- |
| 6 | 20 | "the metalpara positioning" should read --the meta/para positioning-- |
| 6 | 58 | "2-(trifiuoromethyl)phenoxybiphenyl." should read --2-(trifluoromethyl)phenoxybiphenyl.-- |
| 7 | 10 | "6FDNBPDA/DIAMINE" should read --6FDA/BPDA/DIAMINE-- |
| 10 | 45 | "hexafluoropropan" should read --hexafluoropropane-- |
| 10 | 49 | "(trifiuoromethyl)" should read --(trifluoromethyl)-- |
| 12 | 21 | "2,2'-bis(trifiuoromethyl)" should read --2,2'-bis(trifluoromethyl)-- |
| 16 | 41 | "5,490 grams of 6FDA," should read --5.490 grams of 6FDA,-- |

UNITED STATES PATENT AND TRADEMARK OFFICE
CERTIFICATE OF CORRECTION

PATENT NO.: 5,649,045

DATED: July 15, 1997

INVENTOR(S): Douglas E. Fjare, David A. Wargowski

It is certified that error appears in the above-identified patent and that said Letters Patent is hereby corrected as shown below:

| Col. | Line | |
|---|---|---|
| 17 | 12 | "0.75-6FDA/0.25 BPDNB is-AF-OFA" should read --0.75-6FDA/0.25 BPDA/Bis-AF-OFA-- |
| 18 | 27 | "2,2'-bis(trifiuoromethyl)benzidine" should read --2,2'-bis(trifluoromethyl)benzidine-- |
| 23 | 18-19 | "2-(trifiuoromethyl)phenoxy]biphenyl;" should read --2-(trifluoromethyl)phenoxy]biphenyl;-- |
| 23 | 19-20 | "2-(trifiuoromethyl)phenoxy]phenyl]" should read --2-(trifluoromethyl)phenoxy]phenyl]-- |
| 23 | 39 | "(trifiuoromethyl)" should read --(trifluoromethyl)-- |
| 23 | 40 | "2,2'-bis(trifiuoromethyl)benzidine." should read --2,2'-bis(trifluoromethyl)benzidine.-- |

Signed and Sealed this

Twenty-third Day of December, 1997

Attest:

BRUCE LEHMAN

Attesting Officer

Commissioner of Patents and Trademarks